(12) United States Patent
Reynard et al.

(10) Patent No.: US 10,180,311 B2
(45) Date of Patent: Jan. 15, 2019

(54) IGNITER FOR PROPULSION UNIT

(71) Applicants: NEXTER MUNITIONS, Versailles (FR); ROXEL FRANCE, St. Medard en Jalles (FR)

(72) Inventors: Laurent Reynard, Bourges (FR); Jean-Luc Peron, Bourges (FR); Catherine Manuel, Bourges (FR); Didier Zanelli, Bourges (FR); Dominique Leveque, Bourges (FR)

(73) Assignees: NEXTER MUNITIONS, Versailles (FR); ROXEL FRANCE, St. Medard en Jalles (FR)

(*) Notice: Subject to any disclaimer, the term of this patent is extended or adjusted under 35 U.S.C. 154(b) by 298 days.

(21) Appl. No.: 15/337,294

(22) Filed: Oct. 28, 2016

(65) Prior Publication Data

US 2017/0299349 A1 Oct. 19, 2017

(30) Foreign Application Priority Data

Oct. 29, 2015 (FR) ...................................... 15 02284

(51) Int. Cl.
*F42B 3/103* (2006.01)
*F42B 3/107* (2006.01)
*F02K 9/95* (2006.01)
*F42B 3/12* (2006.01)

(52) U.S. Cl.
CPC ............... *F42B 3/103* (2013.01); *F02K 9/95* (2013.01); *F42B 3/107* (2013.01); *F42B 3/124* (2013.01)

(58) Field of Classification Search
CPC .. F42B 3/10; F42B 3/103; F42B 3/107; F42B 3/195; F42B 3/24; F42C 19/08; F42C 19/0819; F42C 19/0823; F42C 19/0838; F42C 99/00
See application file for complete search history.

(56) References Cited

U.S. PATENT DOCUMENTS

| 2,999,460 | A | | 9/1961 | Stinger et al. |
| 3,285,176 | A | * | 11/1966 | Kent ..................... F42B 3/10 |
| | | | | 102/202 |
| 3,878,786 | A | | 4/1975 | Ridgeway |

FOREIGN PATENT DOCUMENTS

| DE | 102014010179 B3 | 3/2015 |
| EP | 0118595 A2 | 9/1984 |

OTHER PUBLICATIONS

Jul. 4, 2016 Preliminary Search Report and Written Opinion issued in French Patent Application No. FR1502284.

* cited by examiner

*Primary Examiner* — Benjamin P Lee
(74) *Attorney, Agent, or Firm* — Oliff PLC

(57) ABSTRACT

An igniter for propulsion unit including a receptacle having at least one opening through which passes a conducting line connected to an ignition carrier of a slapper contained within the receptacle, the igniter being characterized in that at least one elastomer material is disposed between the ignition carrier and the opening such that the pressure of the gases generated by the propulsion unit which is ignited pushes the elastomer material at the vicinity of the opening of the receptacle so that this elastomer material blocks the opening and avoids any gas leak through this opening.

7 Claims, 6 Drawing Sheets

IGNITER FOR PROPULSION UNIT

The technical field of the invention is that of the igniting devices for propulsion unit.

The propulsion units for missiles are usually ignited by hot-wire initiators at 1 Ampere and 1 Watt, which require the arrangement of mechanical safety means between the initiator and the rest of the pyrotechnic chain so as to complies with the military standards of STANAG 4368. In contrast, slapper initiators, which have only secondary explosives, initiated by the projection of a flyer disk on the secondary explosive, allow to avoid the arrangement of safety means at the igniter. The safety devices are then remote, at the electronic board controlling the triggering of the initiator.

Patent DE102014010179 discloses a slapper initiator the electronic board of which is remote and which has a receptacle containing an ignition carrier projecting a flyer disk intended to initiate the explosive contained within the slapper. In order to improve the shock resistance, the ignition carrier is separated from the bottom of the receptacle by a elastic means absorbing the shocks. The ignition carrier is connected to a conducting line passing through an opening which is lateral to the receptacle so as to be able to plug the slapper on the electronic board which controls the slapper. It can be noted that an O-ring is arranged between the ignition carrier and the receptacle.

When this initiator is triggered, the ignition carrier and the entire pyrotechnic chain and the structures located below this carrier are destroyed and can allow the gases, arising from the combustion of a main charge triggered by the igniter described, to pass therethrough. The simple O-ring is not enough to preserve the tightness. In the case of igniting a missile propulsion unit, these gases, the pressure of which is important (about 40 Mega Pascals), can thus leak to the outside of the receptacle via the lateral opening, risking damaging the members located at the vicinity of the initiator, thereby causing safety or reliability problems until the end of the operation of the propulsion unit. The operating time of the propulsion unit is from a few tenths of seconds to hundreds of seconds until the end of flight of the missile, time during which the initiator is subjected to the gas pressure.

The invention proposes to solve this problem of leak, at a high pressure of about 40 Mega Pascals, of a slapper igniter for propulsion unit. Furthermore, according to an embodiment, the invention allows to:
- avoid short circuits that result from a contact between the igniting line and the receptacle of the igniter;
- make the igniter sealed and airtight during storage for its service life.

The invention relates to an igniter for propulsion unit comprising a receptacle having at least one opening through which passes a conducting line connected to an ignition carrier of a slapper contained within the receptacle, the igniter being characterized in that at least one elastomer material is disposed between the ignition carrier and the opening such that the pressure of gases generated by the thruster which is ignited pushes the elastomer material at the vicinity of the opening of the receptacle so that this elastomer material blocks the opening and avoids any gas leak through this opening.

Advantageously, the elastomer material is a silicone elastomer.

Advantageously, the connection between the conducting line and the ignition carrier is provided by conducting pins allowing to dispose the conducting line away from the ignition carrier.

Advantageously, the pins pass through a separating plate located between the conducting line and the ignition carrier, wherein the elastomer material is at least arranged between the separating plate and the conducting line, wherein the separating plate is arranged so as to act as a piston under the pressure of gases of the propulsion unit so as to apply a homogeneous force on the elastomer material.

Advantageously, the igniter has at least one layer of elastomer material between the conducting line and a cover of the receptacle, wherein the elastomer material can wrap the conducting line or fill the free space on either side of this conducting line to prevent any contact of the conducting line from with the receptacle.

Advantageously, the conducting line is embedded within an one-piece layer of elastomer material.

According to a particular embodimen, the elastomer material will block the opening before ignition.

The invention will become more apparent upon reading the following description made with reference to the appended drawings, in which.

Figure 1:
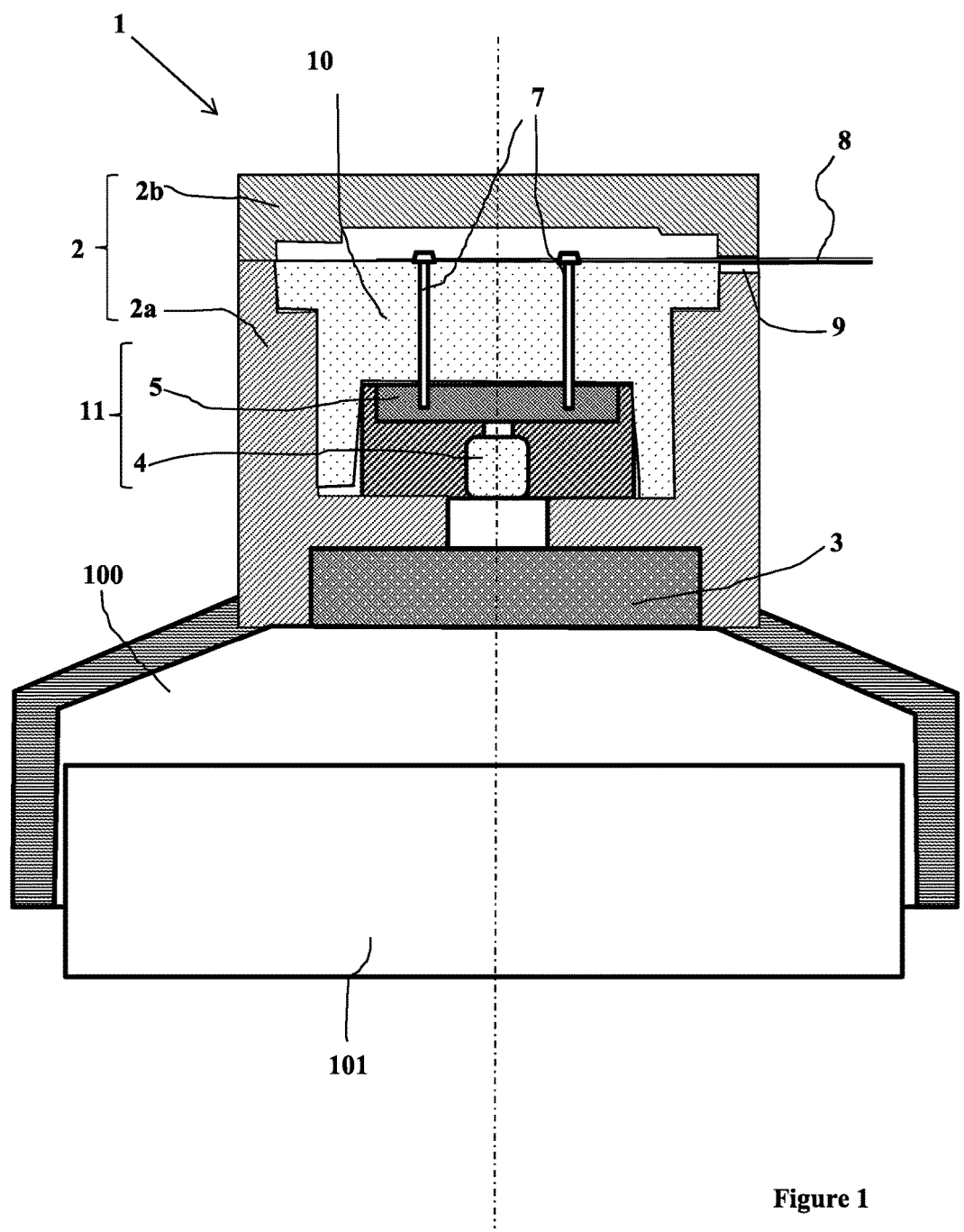
FIG. 1 shows a longitudinal sectional view of an igniter according to a first embodiment of the invention and before ignition.

According to FIG. 1, an end of a propulsion unit 100 for missile includes a propellant charge 101 intended to be ignited by an igniter 1. The igniter 1 has a receptacle 2, divided for the ease of manufacturing, into a lower part 2a, opening towards the propellant charge 101, and a cover 2b covering this lower part 2a. According to a pyrotechnic chain conventionally known by the person skilled in the art, the lower part 2a has an ignition primer 3 which is intended to cause the ignition of the propellant charge 101, this primer 3 being itself ignited by an initiator 11 of the slapper type, comprising a secondary explosive 4.

The explosive 4 is initiated by a flyer disk which is projected by an ignition carrier 5 of the slapper 11.

Triggering of the slapper 11 is controlled by an electrical discharge communicated to the ignition carrier 5 via conducting pins 7 connected to a conducting line 8 for supplying an electrical pulse from a control electronic board which is on board the missile (board and missile not shown).

This conducting line 8 passes through an opening 9 of the receptacle 2. For the ease of implementation, this opening 9 is provided at the matin surface between the cover 2b and the lower part 2a of the receptacle 2. The cover 2b and the lower part 2a of the receptacle are assembled with means known by the person skilled in the art, for example by screwing.

At least one layer of an elastomer material 10 is disposed between the conducting line 8 and the ignition carrier 5. This elastomer material 5 could, for example, be a silicone elastomer.

Figure 2:
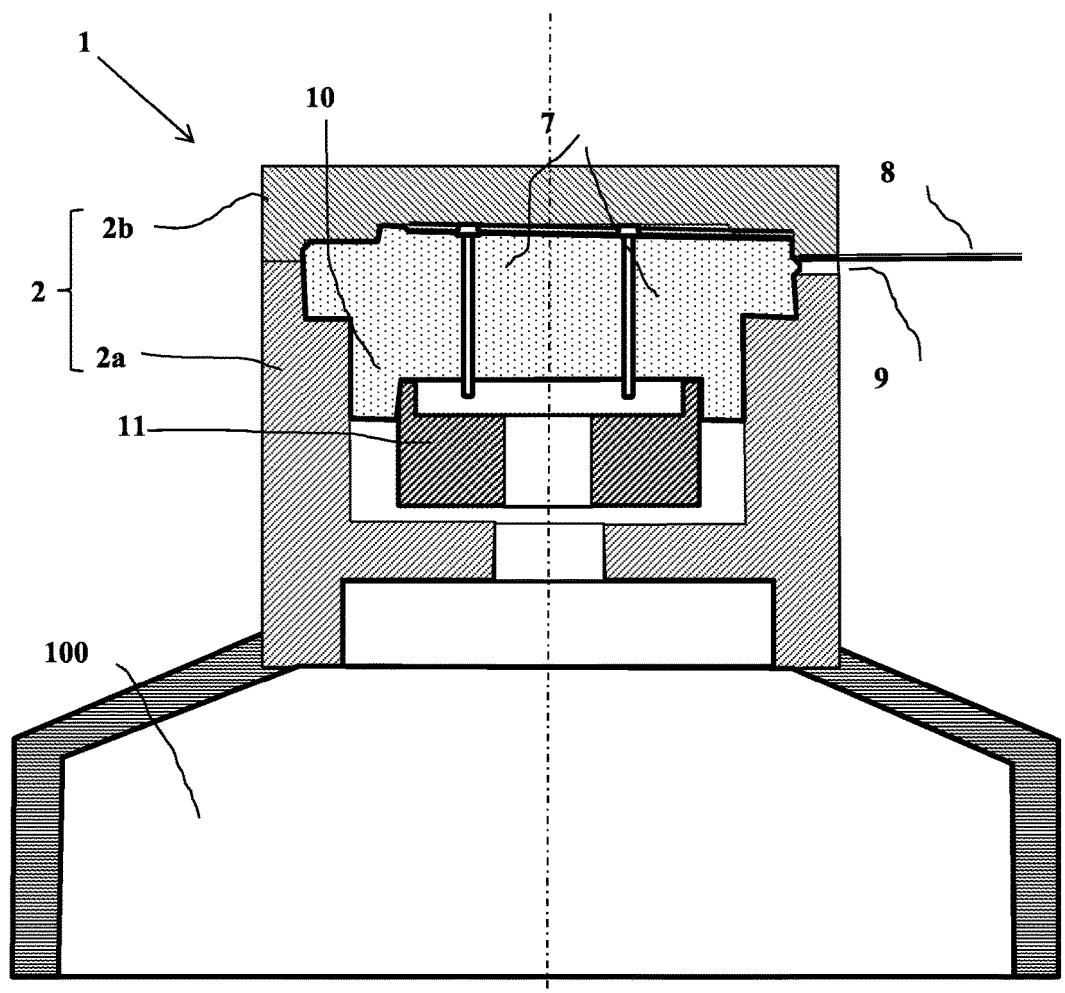
FIG. 2 shows a longitudinal sectional view of this first embodiment during the operation of an ignited thruster.

Thus, according to FIG. 2, when the igniter 1 ignites the propellant charge 101, the entire pyrotechnic chain described above (primer 3 and explosive 4) is destroyed, allowing the free communication of the gas generated by the propellant charge 101 between the interior of the propulsion unit 100 and the interior of the igniter 1.

The gas pressure then applies on the elastomer material 10 which is compressed between the gases on one side and the inner walls of the receptacle 2 on the other side. The deformability of the elastomer causes the latter to creep so as to block the opening 9, thereby avoiding any gas leak to the outside of the igniter. Furthermore, this deformability of the elastomer 10 under pressure prevents the cracking or breaking of the elastomer 10, thereby preserving the gas tightness, even when considering other potential mechanical stresses applied to the igniter, such as vibrations or impacts.

Figure 3:
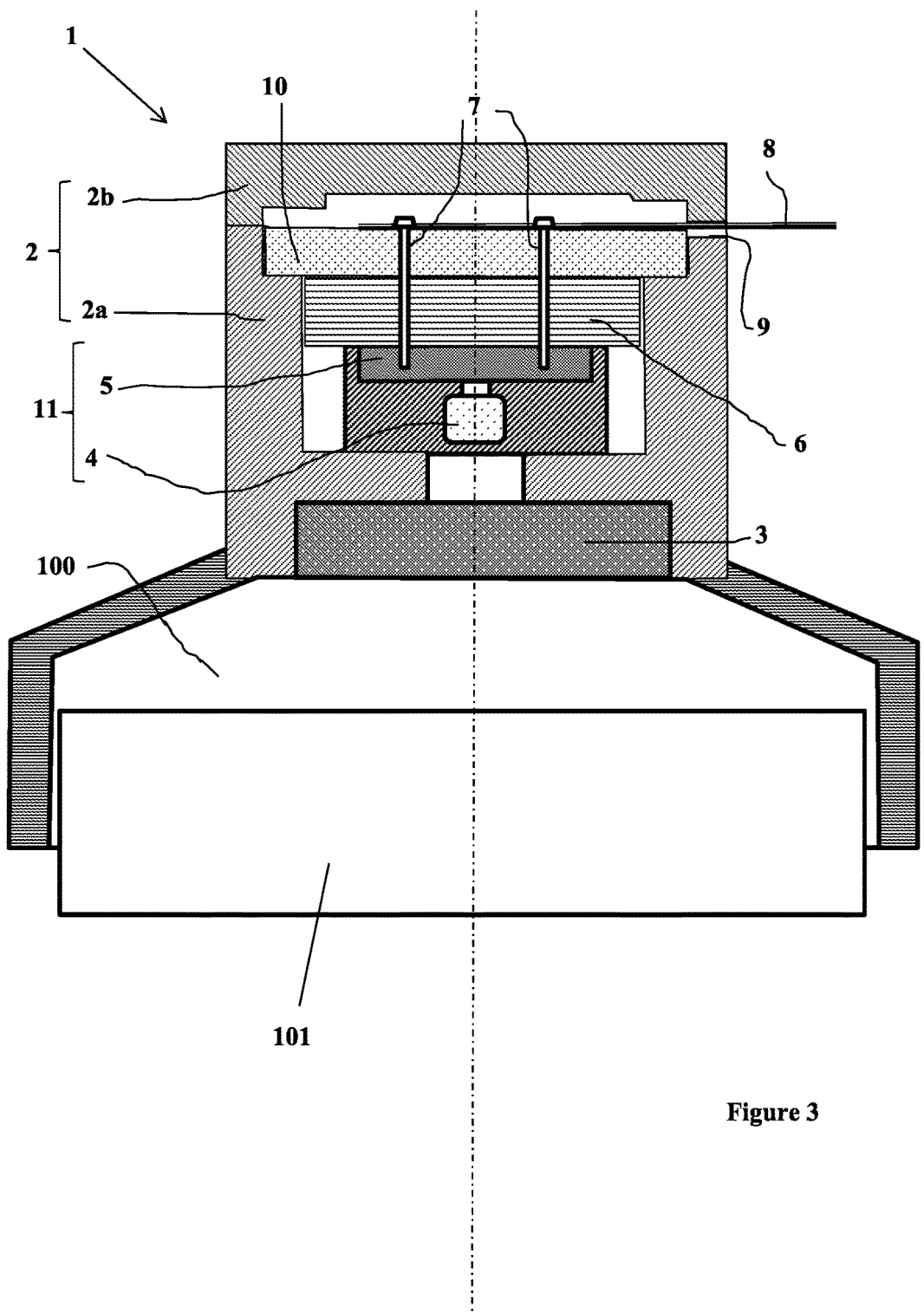
FIG. 3 shows a longitudinal sectional view of an igniter according to a second embodiment of the invention before ignition.
Figure 4:
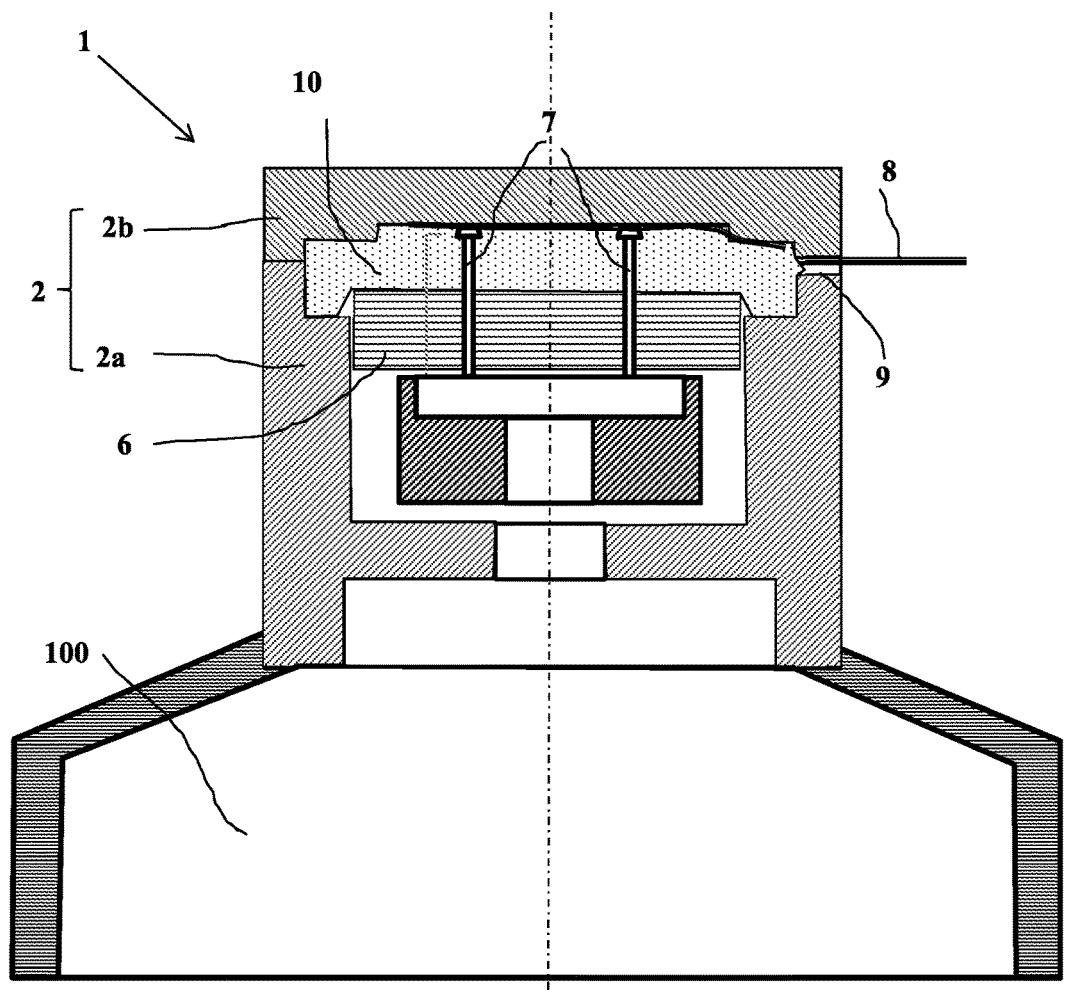
FIG. 4 shows a longitudinal sectional view of this second embodiment during the operation of an ignited thruster.

According to a second embodiment illustrated in FIG. 3, a rigid separating plate 6 is arranged between the layer of elastomer 10 and the ignition carrier 5. When igniting the propellant charge 101 of the propulsion unit 100 (FIG. 4), the gases exert then their pressure on this separating plate 6 which acts as a piston which will press the elastomer material 10 by applying a force evenly distributed, thereby pressing the elastomer material 10 against the inner walls of the receptacle 2 until it blocks the opening 9.

Figure 5:
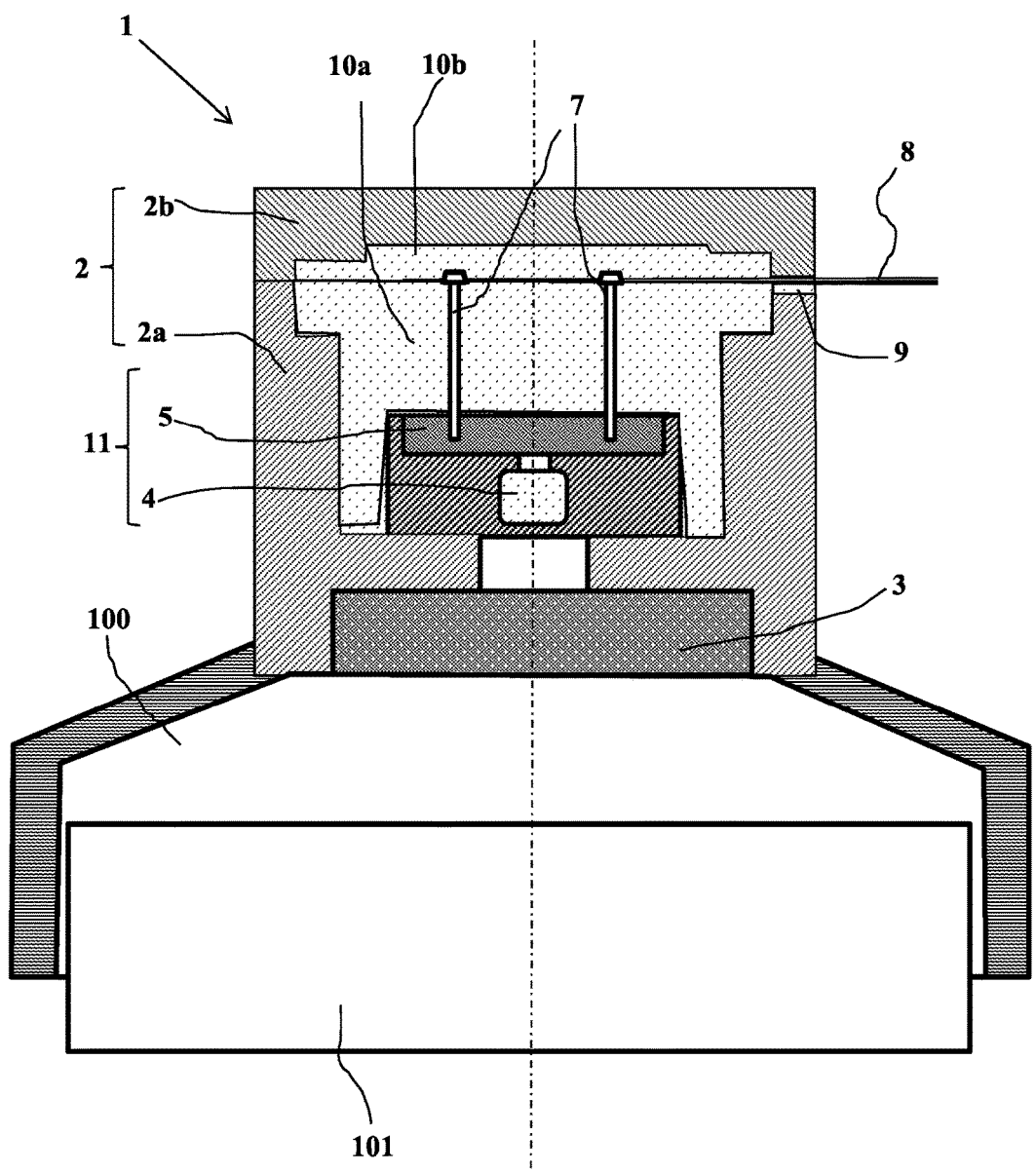
FIG. 5 shows a longitudinal sectional view of an igniter according to a third embodiment of the invention before ignition.

FIG. 5 shows a third embodiment of the invention in which another layer 10*b* of an elastomer material is arranged between the conducting line 8 and the cover 2*b*.

Thus, two layers of elastomer material 10*a* and 10*b* could be provided. The conducting line 8 could also be embedded within a single block 10 of elastomer material. To this end, the elastomer material 10 could be casted from a filling hole provided within the cover 2*b* and then blocked by a suitable plug (not shown).

Figure 6:
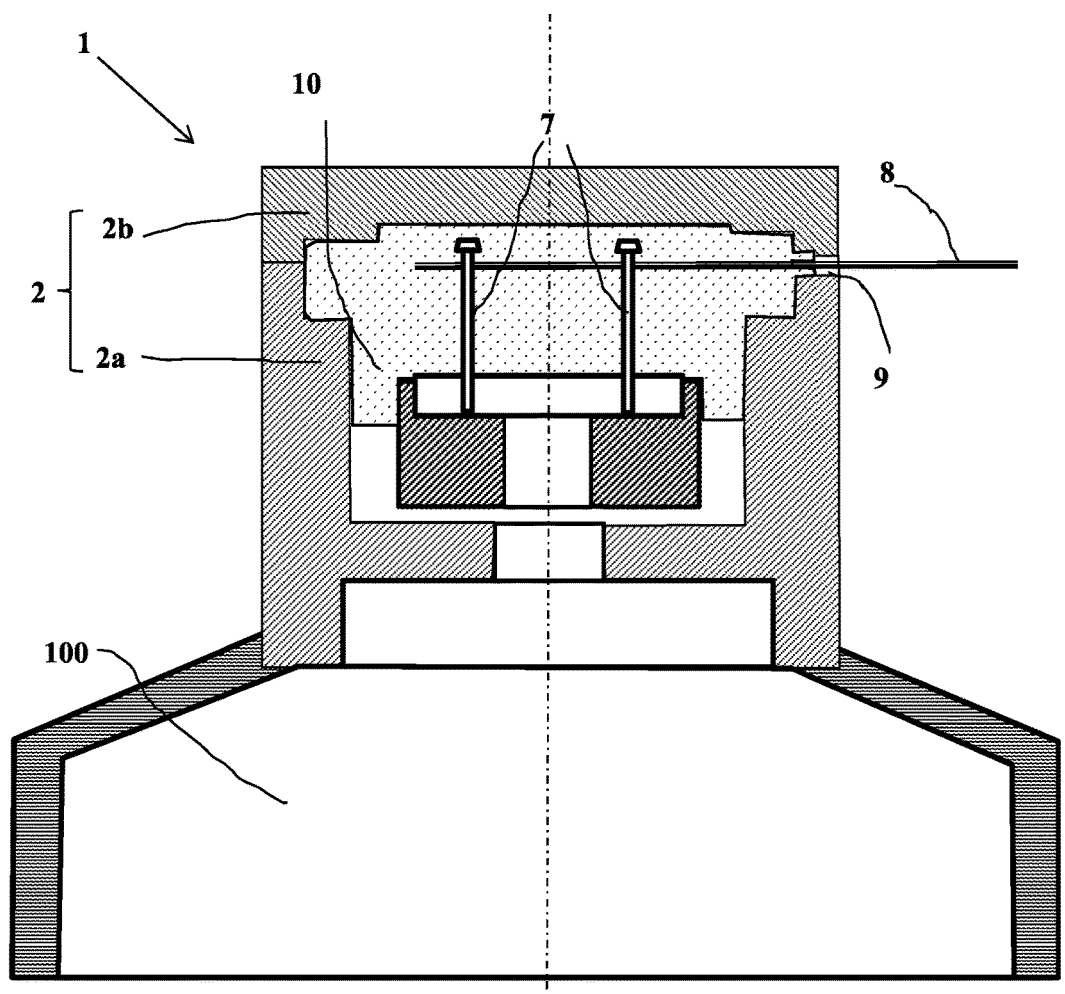
FIG. 6 shows a longitudinal sectional view of an igniter according to the third embodiment during the operation of an ignited thruster.

Thus, the elastomer 10 is distributed all around the conducting line 8, which, under the gas pressure, avoids any gas leak (FIG. 6).

Moreover, the elastomer 10 wraps the conducting line 8, avoiding potential electrical leaks of this line 8 towards the structure of the missile and other missile equipments.

According to a particular embodiment of these FIGS. 5 and 6, the elastomer 10 could occupy the entire upper part of the igniter and could also block the opening 9 before ignition.

In any case, the invention thus allows to ensure that no propellant gas leaks via the igniter 1.

In addition, if the elastomer blocks the opening before ignition, it prevents the penetration of liquid or gas to the igniting carrier when the igniter is stored.

The deformability of the elastomer under pressure thus prevents the cracking or breaking of this material, thereby preserving the performance of gas tightness during the entire operation of the propulsion unit, despite the mechanical stresses (such as vibrations and impacts) undergone by the igniter.

The invention claimed is:

1. An igniter for propulsion unit, the igniter comprising a receptacle having at least one opening through which passes a conducting line connected to an ignition carrier of a slapper contained within the receptacle, wherein at least one elastomer material is disposed between the ignition carrier and the opening such that the pressure of gases generated by the propulsion unit which is ignited pushes the igniter material moving it towards the opening of the receptacle so that this elastomer material blocks the opening and avoids any gas leak through this opening.

2. The igniter according to claim 1, wherein the elastomer material is a silicone elastomer.

3. The igniter according to claim 1, wherein the connection between the conducting line and the ignition carrier is provided by conducting pins allowing to dispose the conducting line away from the ignition carrier.

4. The igniter according to claim 3, wherein the pins pass through a separating plate located between the conducting line and the ignition carrier, wherein the elastomer material is at least arranged between the separating plate and the conducting line, wherein the separating plate is arranged so as to act as a piston under the pressure of gases of the propulsion unit (100) so as to apply a homogeneous force on the elastomer material.

5. The igniter according to claim 1, wherein the igniter has at least one layer of elastomer material between the conducting line and a cover of the receptacle wherein the elastomer material can wrap the conducting line or fill the free space on either side of this conducting line to prevent any contact of the conducting line with the receptacle.

6. The igniter according to claim 1, wherein the conducting line is embedded within a one-piece layer of elastomer material.

7. The igniter according to claim 5, wherein the elastomer material blocks the opening before ignition.

* * * * *